United States Patent [19]

Meier-Burkamp

[11] Patent Number: 5,145,471
[45] Date of Patent: Sep. 8, 1992

[54] PLANET GEAR SUBUNIT OF A PLANET GEAR UNIT

[75] Inventor: Gerhard Meier-Burkamp, Bergrheinfeld, Fed. Rep. of Germany

[73] Assignee: Fichtel & Sachs AG, Schweinfurt, Fed. Rep. of Germany

[21] Appl. No.: 737,243

[22] Filed: Jul. 29, 1991

[30] Foreign Application Priority Data

Jul. 31, 1990 [DE] Fed. Rep. of Germany ....... 4024201

[51] Int. Cl.⁵ ............................................. F16H 57/00
[52] U.S. Cl. .................................................. 475/331
[58] Field of Search ................ 475/331, 334, 346, 347

[56] References Cited

U.S. PATENT DOCUMENTS

| 3,178,967 | 4/1965 | Fritsch | 74/801 |
| 3,421,390 | 1/1969 | Lohr | 475/331 X |

FOREIGN PATENT DOCUMENTS

| 2568340 | 7/1984 | France . |  |
| 58-156773 | 9/1983 | Japan | 475/331 |
| 2-163547 | 6/1990 | Japan | 475/331 |
| 691776 | 5/1953 | United Kingdom | 475/331 |
| 2189569A | 10/1987 | United Kingdom . |  |
| 8401530 | 4/1984 | World Int. Prop. O. . |  |

Primary Examiner—Rodney H. Bonck
Assistant Examiner—Ryan W. Massey
Attorney, Agent, or Firm—Brumbaugh, Graves, Donohue & Raymond

[57] ABSTRACT

A planet wheel carrier is provided with planet wheels. The planet wheels are accommodated within radial windows of the planet wheel carrier, which radial windows extend in radial direction between a central cavity of the planet wheel carrier and the external surroundings thereof. The windows are obtained by turning a circumferential groove into an external circumferential face of the planet wheel carrier, which groove intersects with pockets of the cavity. The planet wheels are axially fastened by the edges of the windows and circumferentially supported by a support plate, which is inserted into the cavity and is non-rotatable with respect to the planet wheel carrier.

24 Claims, 1 Drawing Sheet

PLANET GEAR SUBUNIT OF A PLANET GEAR UNIT

BACKGROUND OF THE INVENTION

This invention relates to a planet gear unit and more particularly to a planet gear subunit thereof comprising a planet wheel carrier member and at least two planet wheel units rotatably accommodated within the planet wheel carrier member.

Such a planet gear subunit is an essential component of a planet gear unit and more particularly of a planet gear unit in a bicycle hub. The overall costs of such a planet gear unit and more particularly of such a bicycle hub are considerably influenced by the manufacturing and assembling costs of the above defined planet gear subunit.

STATEMENT OF THE PRIOR ART

Cold shaped planet wheel carriers with pockets machined therein for receiving planet wheels are well known in the art. These planet wheel carriers are provided with axial bores intended to accommodate bearing pins for the planet wheels. For security reasons, these bearing pins must be axially fixed. The subunits consisting of the planet wheel carrier and the planet wheels can be easily handled in assembling the planet wheel unit as a whole. Moreover, the subunits can be easily stored as components in the manufacturer's plant and also as spare parts. The manufacturing of the subunit per se is, however, relatively complicated. This is true for the machining of the planet wheel carrier as well as for the assembling of the planet wheel carrier with the bearing pins and the planet wheels. As far as the manufacturing of the planet wheel carrier is concerned, the costs thereof are essentially influenced by the turning, machining and boring steps. Besides these steps, further costs occur due to degreasing, deburring and examination.

OBJECT OF THE INVENTION

It is an object of the present invention to provide a planet gear subunit on the basis of a cold-shaped planet wheel carrier which can be easily manufactured at reduced costs and is at least comparable in qualitative respect with known subunits. More particularly, it is an object to provide such a subunit in which the planet wheel carrier can be obtained by a simple turning operation after cold-shaping. Further, it is an object of the present invention to provide such a subunit in which the planet wheel units and further components can be manufactured in a simple way and at reduced costs.

SUMMARY OF THE INVENTION

A planet gear subunit comprises a planet wheel carrier member and at least two planet wheel units rotatably accommodated within said planet wheel carrier member. The planet wheel carrier member has an axis, an external circumferential face and two ends and is provided with a cavity surrounded by an internal circumferential face of the planet wheel carrier member. This cavity is axially open at at least one of the two ends of the planet wheel carrier member. The planet wheel carrier member units are received by radially extending windows open both in radially inward direction towards said cavity and in radially outward direction. A planet wheel support member is accommodated within the cavity and is circumferentially supported by the planet wheel carrier member about the axis. The planet wheel support member has a shape permitting introduction of said planet wheel support member into the cavity through the at least one open end of the cavity. The planet wheel units are circumferentially supported within respective windows by the planet wheel support member.

The existence of the planet wheel support member which is manufactured as a separate part and is inserted into the cavity, facilitates the machining operations at the planet wheel carrier member and the assembling operations: The boring of bores for bearing pins is avoided, and the insertion of the bearing pins into these bores is also avoided.

According to a preferred embodiment, the internal circumferential face has along at least part of its axial length a profile with radially inwards projecting projections and pockets between circumferentially subsequent projections. These pockets intersect a circumferential window exit face machined into said external circumferential face. These windows are provided in a zone of intersection of the pockets and the window exit face.

The circumferential window exit face can be provided by a simple turning operation on the external circumferential face of the planet wheel carrier member. More particularly, the window exit face may be provided by a bottom face of a circumferential groove machined into the external circumferential face. The groove may be obtained by a most simple turning operation.

The support member may have an external profile substantially mating the profile of the internal circumferential face. The profile of the internal circumferential face may be obtained by the cold-shaping operation without further machining steps. So, the requested non-rotatability of the planet wheel support member with respect to the planet wheel carrier member is obtained in a most simple way.

The planet wheel support member may have radially outwards extending arms received by the pockets and circumferentially supported by flank faces separating a respective pocket from adjacent radially inwards directed projections.

The support member may have recesses open in radially outward direction which receive support faces of the respective planet wheel unit.

The support faces may be provided by bearing pins of the respective planet wheel units. As the bearing pins are accommodated as parts of the planet wheel units within the respective windows, no bores are necessary for accommodating the bearing pins.

A planet wheel unit may comprise two axially spaced planet wheel members axially interconnected by a respective bearing pin. Such, a middle section of the bearing pin between the two planet wheel members may be received by a respective recess of the support member. The bearing pin of a planet wheel unit may e. g. cooperate with the planet wheel in that the two ends of the bearing pins are inserted into respective bores of the two planet wheel members. Such, the planet wheel units can be assembled in a most simple way. The planet wheel members may be non-rotatable on the bearing pin, in which case the bearing pin must be freely rotatable with respect to the planet wheel carrier member. It is, however, also possible that the bearing pin is non-rotatable with respect to the planet wheel support member. In this case, the planet wheel members must be freely rotatable with respect to the bearing pin.

The planet wheel members including the respective teeth may be punched from sheet material and more particularly from sheet metal. This is an important feature of the present invention, which can be used also independently of the basic construction of the planet wheel carrier member according to the present invention. One should consider that in the past the teeth of the planet wheels have been most frequently manufactured by common tooth machining operations.

The windows may have an axial width substantially corresponding to the axial length of the planet wheel units. Such a planet wheel unit can be axially positioned with respect to the planet wheel carrier simply by inserting the planet wheel units into the windows. It should be noted here that the bearing pins may be as long as the axial width of the windows. Further, the sum of the axial width of the planet wheel members and the axial width of the planet wheel support member may correspond to the axial width of the window. By this selection of axial dimensions of the various components, it is possible to locate the planet wheel units as a total along the axis of the planet wheel carrier member and to locate each component, namely the planet wheel members, the bearing pins and the planet wheel support member along the axis of the planet wheel carrier member.

The planet wheel members may be loosely assembled with a respective bearing pin engaging respective central bores of respective planet wheel members.

In cases in which the bearing pins are intended to rotate with respect to the planet wheel carrier member, the recesses of the support member may have a substantially semi-circular contour.

In cases in which the bearing pin is intended to be non-rotatable with respect to the planet wheel carrier, the bearing pin may be locked by the respective recess against rotation with respect to the support member. E. g., the ends of the bearing pin may be provided with at least one flat surface engageable with the respective recess of the support member. This is a most preferred embodiment. It is to be noted that, according to the present invention, the planet wheel units may be radially fixed with respect to the planet wheel carrier member and with respect to the support member. This is, however, not necessary. It is also possible that the planet wheel units are self-adjustable in radial direction between an allocated sun wheel and an allocated ring wheel.

The support member is preferably plate-shaped and can be punched from sheet material and more particularly from sheet metal.

The planet wheel carrier member may have a central bore for being supported on a central shaft member, e. g. the shaft member of a bicycle hub.

The central bore may be provided in a collar-shaped extension of the planet wheel carrier member.

The internal circumferential face may have a ratchet zone axially adjacent the windows towards said open end of the cavity. This ratchet zone may be used for transmitting a torque to the planet wheel carrier member through pawls.

The planet wheel carrier member may be obtained by a method of cold shaping, such as cold impact pressing, cold swaging and cold hammering. At least part of the external circumferential face may hereupon be machined by a turning operation for obtaining the windows. The basic form may also comprise the cavity with an internal circumferential profile. With other words, an internal circumferential profile may be obtained by the cold shaping of the planet wheel carrier member. This is also true for the internal ratchet.

An axial bore of the planet wheel carrier and at least part of the external circumferential face may be strictly coaxial as a result of machining operations performed, while said planet wheel carrier member remains chucked in a chucking system. Such, the external circumferential face may be used as a bearing face or a guiding face for a further component of the planet wheel unit, e. g. a ring wheel.

The planet wheel carrier member may further comprise a radially outwards directed flange adjacent the external circumferential face remote from the open end of the cavity. Such a flange may be e. g. obtained by the turning operation.

The invention further comprises a method of manufacturing a planet gear subunit. According to this method, a basic planet wheel carrier member having an axis, two ends, an external circumferential face about said axis, a cavity surrounded by an internal circumferential face of said planet wheel carrier member and open towards at least one end of said basic wheel carrier member is cold-shaped. By this cold-shaping step, the internal circumferential face is provided with a profile having radially inwards directed projections and pockets between circumferentially subsequent projections. Material is removed from the external circumferential face by a turning operation, until said turning operation intersects with the pockets. Such, windows are obtained which are open both in radially inward direction towards said cavity and in radially outward direction. A planet wheel support member may then be inserted through the open end into the cavity in a location adjacent the windows such that the planet wheel support member is substantially non-rotatable with respect to the basic planet wheel carrier member. Hereupon, planet wheel units may be inserted in radially inward direction into the windows in circumferentially supporting engagement with the planet wheel support member.

It is easily to be understood that an essential aspect of the invention lies already in the manufacturing of the planet wheel carrier member per se, irrespective of the later assembling with the planet wheel units. One may e. g. manufacture the planet wheel carrier member in a first plant and leave the assembling to a separate assembling plant in which the assembling of the planet wheel carrier member with the planet wheel units may be performed in the course of an overall assembling operation of the respective planetary gear units or bicycle hubs.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings, in which.

DETAILED DESCRIPTION OF THE PREFERRED EMBODIMENT

Figure 1:
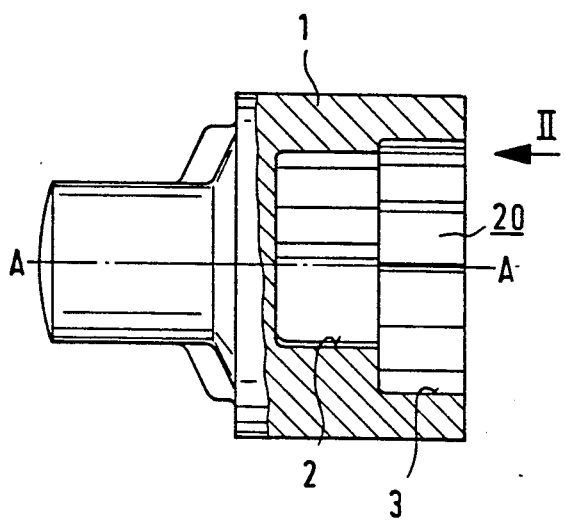
FIG. 1 shows a side view partially in longitudinal section of a planet wheel carrier according to this invention.
Figure 2:
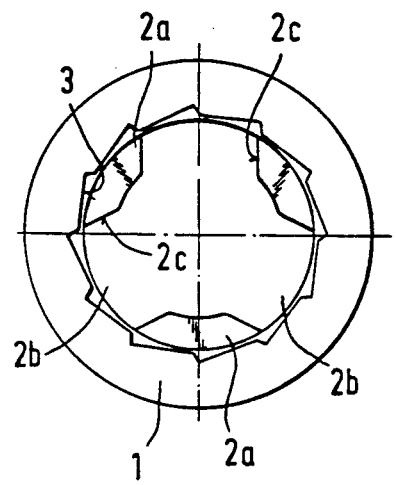
FIG. 2 shows an end view of the planet wheel carrier as seen in the direction of arrow II of FIG. 1.

In FIG. 1, a basic or raw member of a planet carrier is shown. This planet carrier has an axis A—A. A cavity 20 is provided within the raw member. The raw member has been manufactured by cold shaping. During this cold shaping operation, the external shape of the raw member has been obtained as shown in FIG. 1. Moreover, the cavity 20 has also been obtained during this cold shaping operation. The cavity 20 is confined by an internal face 2 and an internal face 3 axially adjacent to each other. The internal face 2 comprises radially inwards projecting projections 2a and pockets 2b between circumferentially subsequent projections 2a. The projections 2a provide flank faces 2c. The pockets 2b are located between mutually adjacent flank faces 2c of circumferentially subsequent projections 2a. The internal face 3 is shaped as a ratchet zone adapted for a one-way torque transmission from a pawl carrying driver member to the planet wheel carrier.

Figure 3:
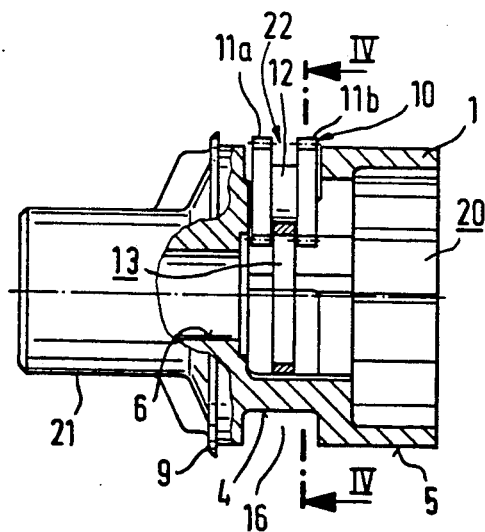
FIG. 3 shows a side view partially in longitudinal section of the completed planet wheel carrier with planet wheels inserted therein and FIG. 4 shows a section according to line IV—IV of FIG. 3.
Figure 4:
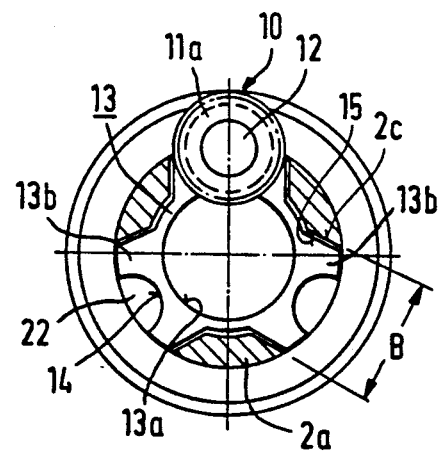

In FIG. 3, the planet wheel carrier has already been machined. Such, a bore 6 has been bored into the collar 21. An external surface 5 has been obtained by a turning operation. A flange 9 has further been obtained by this turning operation. A circumferential groove 16 has been obtained also by a turning operation. The bottom face 4 of the circumferential groove 16 has a diameter which is smaller than the diameter of the cavity 20 in the circumferential areas of the pockets 2b. So, the pockets 2b are intersecting with the circumferential groove 16, and windows 22 are obtained which are open both radially inwards towards the cavity 20 and radially outwards towards the surroundings of the planet wheel carrier 1. A plate-shaped planet wheel support member 13 is inserted into the cavity 20 in radial alignment with the windows 22. The support member 13 is star-shaped with a central bore 13a and legs 13b. The legs 13b are shaped such as to enter into pockets 2b. The legs 13b have engagement faces 15 engageable with the flank faces 2c of the projections 2a. Such, the support member 13 is non-rotatably fixed with respect to the planet wheel carrier member 1. Planet wheel units 10 are inserted into the three windows 22 each comprising two planet wheels 11a and 11b and a bearing pin 12. The planet wheels 11a and 11b are punched from sheet metal with the teeth being obtained from the punching operation. The bearing pin 12 engages central bores of the planet wheels 11a,11b. The planet wheels 11a,11b are freely rotatable on the bearing pin 12. The planet wheels 11a,11b are provided on both sides of the support member 13. The sum of the axial width of the planet wheels 11a,11b and the support member 13 substantially corresponds to the axial width of the windows 22. The axial length of the bearing pin 12 also corresponds substantially to the axial width of the windows 22. The legs 13b are provided at their radially outer ends with semi-circular recesses 14. These semi-circular recesses 14 are adapted to receive the bearing pins 12. Such, the bearing pins 12 are circumferentially fastened with respect to the support member 13 and consequently also with respect to the planet wheel carrier member 1. The circumferential width B of the windows 22 is somewhat larger than the external diameter of the planet wheels 11a,11b. The planet wheel units 10 are inserted into the windows 22 after the support member 13 has been positioned in the axial position as shown in FIG. 3.

It is well possible that the bearing pins 12 have flattened end portions which are in non-rotatable engagement with complementary recesses 14. In this case, the rotation of the planet wheels 11a and 11b can occur only with respect to the bearing pins 12.

The bore 6, the external surface 5 and the circumferential groove 16 may be machined, during the planet wheel carrier 1 is and remains chucked in a chuck unit. Thus, the external circumferential face 5 is strictly coaxial with the bore 6. A further component of a planet wheel unit, e. g. a ring gear, may be guided or rotatably mounted on the external circumferential face 5.

The planet wheel units 10 may be exactly defined in their radial location by the circular recesses 14 of the support member 13. It is, however, also possible that in operation, the planet wheel units 10 are radially floating between a sun wheel (not shown) and a ring wheel (not shown). The support member 13 is also punched from sheet metal.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A planet gear subunit comprising a planet wheel carrier member (1) and at least two planet wheel units (10) rotatably accommodated within said planet wheel carrier member (1), said planet wheel carrier member (1) having an axis (A—A), an external circumferential face (5) and two ends and being provided with a cavity (20) surrounded by an internal circumferential face (2,3) of said planet wheel carrier member (1) and being axially open at least at one of said two ends, said planet wheel units (10) being received by radially extending windows (22), a planet wheel support member (13) being accommodated within said cavity (20) and being circumferentially supported by said planet wheel carrier member (1) about said axis (A—A), said planet wheel support member (13) having a shape permitting introduction of said planet wheel support member (13) into said cavity (20) through said at least one open end of said cavity (20), said planet wheel units (10) being circumferentially supported within said respective windows (22) by said planet wheel support member (13).

2. A planet gear subunit as set forth in claim 1, with said internal circumferential face (2,3) having along at least part of its axial length a profile with radially inwards projecting projections (2a) and pockets (2b) between circumferentially subsequent projections (2b), said pockets (2b) intersecting a circumferential window exit face (4) machined into said planet wheel carrier member (1), said windows (22) being provided in a zone of intersection of said pockets (2b) and said window exit face (4).

3. A planet gear subunit as set forth in claim 2, with said window exit face (4) being provided by a bottom face (4) of a circumferential groove (16) machined into said external circumferential face (5).

4. A planet gear subunit as set forth in claim 2, with said planet wheel support member (13) having an external profile (13b) substantially mating said profile (2a,2b) of said internal circumferential face (2,3).

5. A planet gear subunit as set forth in claim 4, with said planet wheel support member (13) having radially outwards extending arms (13b) received by said pockets (2b) and circumferentially supported by flank faces (15) separating a respective pocket (2b) from adjacent radially inwards directed projections (2a).

6. A planet gear subunit as set forth in claim 1, with said planet wheel support member (13) having recesses (14) open in radially outward direction and receiving support faces (12) of respective planet wheel units (10).

7. A planet gear subunit as set forth in claim 6, with said support faces (12) being provided by bearing pins (12) of said planet wheel units (10).

8. A planet gear subunit as set forth in claim 7, with a planet wheel unit (10) comprising two axially spaced planet wheel members (11a,11b) axially interconnected by a respective bearing pin (12), a middle section of said bearing pin (12) between said two planet wheel members (11a,11b) being received by a respective recess (14) of said planet wheel support member (13).

9. A planet gear subunit as set forth in claim 8, with said planet wheel member (11a,11b) being punched from sheet material and more particularly from sheet metal.

10. A planet gear subunit as set forth in claim 8, with said planet wheel members (11a,11b) being loosely assembled with a respective bearing pin (12) engaging respective central bores of respective planet wheel members (11a,11b).

11. A planet gear subunit as set forth in claim 10, with said bearing pin (12) being locked by the respective recess against rotation with respect to said planet wheel support member (13), said planet wheel members (11a,11b) being rotatably mounted on said bearing pin (12).

12. A planet gear subunit as set forth in claim 6, with said recesses (14) of said planet wheel support member (13) having a substantially semi-circular contour.

13. A planet gear subunit as set forth in claim 1, with said windows (22) having an axial width substantially corresponding to the axial length of said planet wheel units (10).

14. A planet gear subunit as set forth in claim 1, with said planet wheel support member (13) being flat.

15. A planet gear subunit as set forth in claim 14, with said planet wheel support member (13) being punched from sheet material and more particularly from sheet metal.

16. A planet gear subunit as set forth in claim 1, with said planet wheel carrier member (1) having a central bore (6) for being supported on a central shaft member.

17. A planet gear subunit as set forth in claim 16, with said central bore (6) being provided in a collar-shaped extension (21) of said planet wheel carrier member (1).

18. A planet gear subunit as set forth in claim 1, with said internal circumferential face (2,3) having a ratchet zone (3) axially adjacent said windows (22) towards said open end of said cavity (20).

19. A planet gear subunit as set forth in claim 1, with said planet wheel carrier member (1) having a basic form obtained by a method of cold shaping, such as cold impact pressing, cold swaging and cold hammering, at least part of said external circumferential face (5) being machined by a turning operation.

20. A planet gear subunit as set forth in claim 19, with said basic form comprising said cavity (20) with an internal circumferential profile having inward projections (2a,2b).

21. A planet gear subunit as set forth in claim 20, with said basic form comprising an internal ratchet (3) adjacent said internal profile having inward projections (2a,2b).

22. A planet gear subunit as set forth in claim 19, an axial bore (6) of said planet wheel carrier member (1) and at least part of said external circumferential face (5) being coaxial.

23. A planet gear subunit as set forth in claim 1, with said planet wheel carrier member (1) comprising a radially outwards directed flange (9) adjacent said external circumferential face (5) remote from said open end of said cavity (20).

24. A method of manufacturing a planet gear subunit comprising
cold shaping a basic planet wheel carrier member (1) having an axis (A—A), two ends, an external circumferential face about said axis, a cavity (20) surrounded by an internal circumferential face of said planet wheel carrier member (1) and open towards at least one end of said basic planet wheel carrier member (1), said internal circumferential face (2,3) being provided with a profile (2a,2b) having radially inwards directed projections (2a) and pockets (2b) between circumferentially subsequent projections (2a), removing material from said external circumferential face by a turning operation, until said turning operation intersects with said pockets (2a), such as to obtain windows (22) open both in radially inward direction towards said cavity (20) and in radially outward direction,
inserting a planet wheel support member (13) through said open end into said cavity (20) in a location adjacent said windows (22) such that said planet wheel support member (13) is substantially non-rotatable with respect to said basic planet wheel carrier member (1) and inserting planet wheel units (10) in radially inward direction into said windows (22) in circumferentially supporting engagement with said planet wheel support member (13).

* * * * *